US012809354B2

(12) United States Patent
Lutz

(10) Patent No.: US 12,809,354 B2
(45) Date of Patent: Nov. 24, 2026

(54) ALARM-ASSOCIATED CONTAINERS IN PLANT DIAGRAMS OF TECHNICAL PLANTS

(71) Applicant: Siemens Aktiengesellschaft, Munich (DE)

(72) Inventor: Benjamin Lutz, Pfinztal (DE)

(73) Assignee: Siemens Aktiengesellschaf, Munich (DE)

( * ) Notice: Subject to any disclaimer, the term of this patent is extended or adjusted under 35 U.S.C. 154(b) by 259 days.

(21) Appl. No.: 18/684,092

(22) PCT Filed: Aug. 16, 2022

(86) PCT No.: PCT/EP2022/072872
§ 371 (c)(1),
(2) Date: Feb. 15, 2024

(87) PCT Pub. No.: WO2023/021041
PCT Pub. Date: Feb. 23, 2023

(65) Prior Publication Data
US 2025/0013225 A1 Jan. 9, 2025

(30) Foreign Application Priority Data
Aug. 18, 2021 (EP) .................................... 21191974

(51) Int. Cl.
*G05B 19/418* (2006.01)
*G05B 23/02* (2006.01)

(52) U.S. Cl.
CPC .... *G05B 19/41835* (2013.01); *G05B 23/0272* (2013.01); *G05B 2219/31001* (2013.01); *G05B 2219/31467* (2013.01)

(58) Field of Classification Search
CPC .... G05B 19/41835; G05B 2219/31001; G05B 2219/31467; G05B 23/0272
See application file for complete search history.

(56) References Cited

U.S. PATENT DOCUMENTS

2005/0162268 A1 7/2005 Grindstaff et al.
2018/0286723 A1 10/2018 Fujiki et al.
(Continued)

FOREIGN PATENT DOCUMENTS

CN 1898707 1/2007
CN 104700585 6/2015
(Continued)

OTHER PUBLICATIONS

PCT International Search Report dated Nov. 2, 2022 based on PCT/EP2022/072872 filed Aug. 16, 2022.

*Primary Examiner* — Thomas K Pham
(74) *Attorney, Agent, or Firm* — Cozen O'Connor

(57) ABSTRACT

A control system for a technical plant, in particular processing or manufacturing plant, includes an operator station server and an operator station client, wherein the operator station server transmits a plant diagram of the technical plant to the operator station client for control and observation purposes, where the operator station client visually and possibly acoustically renders a plant diagram with a variable diagram element to an operator, an alarm service implemented on the operator station server transmits alarm notifications to the operator station client for output to the operator, where the control system provides the variable diagram element with a reference to a particular alarm notification that arises and provides the particular alarm notification that arises and/or the variable diagram element with a reference to an object, such that, when the particular alarm notification arises does arise, the object is visually and possibly acoustically rendered in the variable diagram element.

22 Claims, 4 Drawing Sheets

(56) References Cited

U.S. PATENT DOCUMENTS

| | | | |
|---|---|---|---|
| 2018/0345853 | A1 | 12/2018 | Gao |
| 2019/0170096 | A1 | 6/2019 | Schini et al. |

FOREIGN PATENT DOCUMENTS

| | | | | |
|---|---|---|---|---|
| EP | 3079029 | | 10/2016 | |
| EP | 3495903 | | 6/2019 | |
| EP | 3680740 | | 7/2020 | |
| EP | 4043974 | A1 * | 8/2022 | ....... G05B 19/41835 |
| JP | H06175806 | | 6/1994 | |
| WO | 2020064712 | | 4/2020 | |

* cited by examiner

ALARM-ASSOCIATED CONTAINERS IN PLANT DIAGRAMS OF TECHNICAL PLANTS

CROSS-REFERENCE TO RELATED APPLICATIONS

This is a U.S. national stage of application No. PCT/EP2022/072872 filed 16 Aug. 2022. Priority is claimed on European Application No. 21191974.1 filed 18 Aug. 2021, the content of which is incorporated herein by reference in its entirety.

BACKGROUND OF THE INVENTION

1. Field of the Invention

The invention relates to a method for the visual representation of a plant diagram of a technical plant and relates to a control system for a technical plant, in particular processing or manufacturing plant, which has an operator station server and an operator station client, where for activation and monitoring, the operator station server is configured to transmit a plant diagram of the technical plant to the operator station client, where the plant diagram comprises at least one variable diagram element, where the operator station client is configured to visually, and optionally acoustically, represent the plant diagram with the variable diagram element to an operator of the technical plant, and where an alarm service is implemented on the operator station server and is configured to transmit alarm notifications occurring in the control system to the operator station client for presentation to the operator.

2. Description of the Related Art

For the activation and monitoring of process-engineering plants, control systems of the process-engineering plants create symbolic plant diagrams, which represent the process-engineering relationships (particularly between individual process objects of the process-engineering plants) in an abstract manner.

Plant diagrams are composed of static symbols (for example lines, and/or rectangles), dynamized symbols (for example, lines with color change or rectangles with fill levels, which change as a function of process measurements), block symbols (for dynamized visualization of process-engineering process objects), complex controls (for example, trend indicators, and/or notification sequence displays) and containers in which contents from independent and stand-alone sources can be visualized. These sources can be, for example, webcams, plant diagrams of modular plant components ("Package Units"), Apps (for example, controller optimzers, KPI calculations) and the like.

The containers are achieved via different technologies. In modern web-oriented control systems, "iFrames" can be used for this, and these are used, for example, in the "Siemens Web Application Collaboration" (SWAC) technology used by the company SIEMENS.

The previously mentioned complex controls (trend indicators, XY graphs, notification sequence displays, SFC sequencers, CFC visualization, or batch) can also be embedded in plant diagrams with the aid of containers because the underlying applications can thus be decoupled at the server and be distributed to achieve a higher degree of robustness.

If, for example, a plurality of webcams are supposed to enable a view of process-engineering plant components in real-time, then a container is to be projected in a plant diagram for each webcam. If an alarm occurs in a process-engineering plant component, then the corresponding plant diagram must be opened with the webcam that provides the view of the respective plant component. Often neither notification texts nor views in real-time are sufficient for efficiently dealing with complex alarms-further context, such as P&ID diagrams, excerpts from operating manuals and the like, can be necessary.

Conventional control systems, which visually present an operator with plant diagrams with different objects, such as containers, are disclosed, for example, in WO 2020/064712 A1 and EP 3680740 A1.

SUMMARY OF THE INVENTION

It is an object of the invention to provide a control system for a technical plant which makes it possible for an operator of the control system to have a clearer overview of an operating state of a technical plant and in the event of an alarm state of the technical plant, purposeful information for resolving the alarm state can be made available to the operator.

This and other objects and advantages are achieved in accordance with the invention by a control system for a technical plant, in particular a manufacturing or processing plant, and by a method for operating a technical plant, in particular processing or manufacturing plant.

The control system in accordance with the invention has an operator station server and an operator station client. For activation and monitoring, the operator station server is configured to transmit a plant diagram of the technical plant to the operator station client, where the plant diagram comprises at least one variable diagram element. The operator station client is configured to visually, and optionally acoustically, represent the plant diagram with the variable diagram element to an operator of the technical plant. An alarm service is implemented on the operator station server and is configured to transmit alarm notifications occurring in the control system to the operator station client for presentation to the operator.

The inventive control system is configured to provide the variable diagram element with a reference to a particular alarm notification that can occur and the particular alarm notification that can occur and/or the variable diagram element with a reference to an object such that, when the particular alarm notification that can occur does occur, the object is visually and optionally acoustically represented in the variable diagram element.

In the present context, a control system is taken to mean a computer-aided technical system, which comprises functionalities for representing, activating and controlling a technical system, such as a manufacturing or production plant. In addition to the operator station server and the operator station client, the control system can also comprise, for example, what are known as processing- or manufacturing-related components, which serve to actuate actuators or sensors.

The technical plant can be a plant from the process industry, such as a chemical, pharmaceutical, petrochemical or a plant from the food, beverage and tobacco industry. This also comprises any plant from the production industry, factories in which, for example, cars or goods of all kinds are produced. Technical plants, which are suitable for implementing the inventive method, can also come from the energy production sector. Wind turbines, solar plants or power stations for energy production are likewise incorporated by the term "technical plant".

In the present disclosure, an "operator station server" is taken to mean a server that centrally captures data of an activation and monitoring system and, as a rule, alarm and measurement archives of a control system of a technical plant, and makes it available to users. As a rule, the operator station server establishes a communications link to automation systems (such as an automation device) of the technical plant and relays data from the technical plant to what are known as "operator station clients" which serve for activation and monitoring of an operation of the individual functional elements of the technical plant.

The operator station server can itself possess client functions in order to access the data (archives, notifications, tags, variables) of other operator station servers. As a result, diagrams of an operation of the technical plant on the operator station server can be combined with variables of other operator station servers (server-server communication). The operator station server can be, without being limited hereto, a SIMATIC PCS 7 Industrial Workstation server belonging to the company SIEMENS.

An operator is taken to mean a human user of the technical plant. The operator interacts with the technical plant or its control system via special user interfaces and controls specific technical functions of the plant. The operator can use the activation and monitoring system of the control system with the operator station server and the operator station client for this purpose.

The plant diagram, which the operator station server transmits to the operator station client for visual representation, is a control panel display customarily used for control systems, which comprises graphical representations of individual elements of the technical plant and serves for representation of a status of the individual elements, of a (for example, process-engineering) relationship between the elements or the like. The individual elements of the technical plant are graphically represented in the plant diagram by respective diagram elements. In the present disclosure, the plant diagram comprises at least one variable diagram element.

The variable diagram element has a content that can change in relation to a runtime of the technical plant, in particular a real-time diagram data source, a further plant diagram, a video or a document, such as a piping diagram of the technical plant. The variable diagram element can also visually (and optionally also acoustically) represent a trend indicator for measurements of the technical plant, a notification sequence display for notifications of the control system or a controller optimization function. In other words, the variable diagram element can also be referred to as a (web) container that can be variably filled with dynamically changeable content.

An alarm notification is a notification that necessitates an, as a rule, immediate reaction of the operator of the technical plant. A notification is taken to mean a report on the occurrence of an event that represents a transition from a discrete state inside the technical plant into another discrete state.

During the course of a projection of an automation of the technical plant, it is defined, inter alia, which components of the technical plant can cause an occurrence of an alarm notification under certain conditions. For example, it is possible to define that an alarm notification is generated (or occurs) if the pressure in a boiler exceeds a particular threshold value.

The inventive control system enables a fine-grained indication of the loading state of the diagram element for more efficient activation and monitoring of the technical plant. By way of the control system, the operator receives knowledge about the point in time from which the opened plant diagram with the at least one diagram element can be fully observed or which portions of the diagram element are still to be reloaded (have to be reloaded).

The control system is inventively configured to provide the variable diagram element with a reference to a particular alarm notification that can occur. The particular alarm notification that can occur can in turn be provided with a reference to an object. The references can be defined within the framework of the projection of an automation of the technical plant. However, it is also possible for the operator to newly apply or change the references in relation to a runtime of the technical plant. It is also possible that the references are automatically generated by the control system on the basis of particular conditions.

If an alarm notification that can occur does actually occur, then the referenced object is visually and optionally also acoustically represented in the framework of the variable diagram element. A real-time diagram data source, a further plant diagram, a video or a document constitutes an object.

The reference to the object to be represented can be associated with the alarm notification and/or the variable diagram element. It is only important that when an alarm notification, which has a predetermined type, occurs, the predetermined object is visually (and optionally acoustically) represented in an allocated variable diagram element.

The inventive control system is accordingly particularly advantageously configured to generate alarm-associated dynamic diagram elements (containers) in plant diagrams (for example, process-engineering plant diagrams) for improved activation and monitoring of the technical plant. The control system enables plant diagrams (in particular overview diagrams) to be compactly established if content from independent and stand-alone sources (for example, objects hosted by a web server) are to be integrated. For dealing with complex alarms, the control system more efficiently and purposefully provides (any desired) context. In addition, the inventive control system makes it possible for an operator to only be confronted with the information that he purposefully requires for dealing with the alarm notification alarm.

In addition to the referenced object, the control system can be configured to represent items of information relating to the alarm notification, in particular an alarm notification text, in the variable diagram element when a referenced alarm notification occurs. As a result, the operator purposefully receives the items of information from the referenced object as well as from the alarm notification.

The control system is not limited to the representation/processing of a plant diagram with a single variable diagram element. Instead, the plant diagram can comprise a plurality of variable diagram elements, where the control system is configured to provide the variable diagram elements with one reference respectively to a particular alarm notification that can occur and the particular alarm notification that can occur and/or the variable diagram elements with a reference to an object such that when the particular alarm notification that can occur does occur, the object is in each case visually and optionally acoustically represented in the variable diagram element, where the particular diagram elements that can occur and the objects can differ from each other.

The control system is likewise not limited to referencing only a single alarm notification that can occur in a respective variable diagram element. Instead, the control system can be configured to provide the variable diagram element with a plurality of references to particular alarm notifications that can occur and the particular alarm notifications that can occur and/or the variable diagram elements with one reference respectively to an object such that when one of the particular alarm notifications that can occur does occur, the respective referenced object is visually and optionally acoustically represented in the variable diagram element.

For the case where a plurality of the referenced alarm notifications that can occur do occur in the same period, the control system is preferably configured to represent that object in the variable diagram element, which is referenced by that alarm notification that occurs, which has the highest priority or the most recent time ranking or which has not been acknowledged. The objects to be represented are thus automatically prioritized according to predefinable criteria. As a result, the alarm notification deemed to be the most critical can be represented with the referenced object to the operator particularly effectively, so that the operator can initiate measures immediately.

For the case where a plurality of the referenced alarm notifications that can occur do occur in the same period, the control system can also be configured to represent the objects referenced by the occurring alarm notifications in a manner that can be manually changed by an operator of the control system or in a manner that changes automatically over time. As a result, the operator can receive an improved overview of objects relating to alarm notifications (such as a plurality of camera images).

As long as no alarm notification referenced by a variable diagram element occurs, the variable diagram element can represent an initial object, which is not referenced by any referenced alarm notifications (a "neutral" third object, therefore). In other words, in a period in which none of the particular alarm notifications occurs, the control system can be configured to generate a visual and optionally an acoustic representation in the variable diagram element of an object different from the referenced object(s). The initial diagram representation can be specified during the projection of the automation and/or be specified by the operator.

The objects and advantages in accordance with the invention are also achieved by a method for operating a technical plant, in particular processing or manufacturing plant, which has a control system, which has an operator station server and an operator station client, and where the operator station client is configured to visually, and optionally acoustically, represent the plant diagram with the variable diagram element to an operator of the technical plant, and where an alarm service is implemented on the operator station server and is configured to transmit alarm notifications occurring in the control system to the operator station client for presentation to the operator.

The method comprises the a) providing the variable diagram element with a reference to a particular alarm notification that can occur, b) providing the particular alarm notification that can occur with a reference to an object, and c) when the particular alarm notification that can occur does occur, visual and optionally acoustic representation of the object in the variable diagram element by the operator station client.

Preferably, a plurality of variable diagram elements is provided with one reference respectively to one or more particular alarm notification(s) that can occur, and where the particular alarm notification(s) that can occur are provided with one reference respectively to an object, where this can be a single object or a plurality of objects, and where when one of the particular alarm notifications that can occur does occur, the object or the objects is/are visually and optionally acoustically represented in the variable diagram element(s) by the operator station client.

Within the framework of an advantageous embodiment of the invention, in addition to the referenced object, items of information relating to the alarm notification, in particular an alarm notification text, are also represented in the variable diagram element when a referenced alarm notification occurs.

The variable diagram element can be provided with a plurality of references to particular alarm notifications that can occur and the particular alarm notifications that can occur with one reference respectively to an object such that when one of the particular alarm notifications that can occur does occur, the respective referenced object is represented visually and optionally acoustically in the variable diagram element.

Preferably, for the case where a plurality of the referenced alarm notifications that can occur does occur in the same period, the object is represented in the variable diagram element, which is referenced by that alarm notification that occurs, which has the highest priority or the most recent time ranking or which has not been acknowledged.

Alternatively or in addition, for the case where a plurality of the referenced alarm notifications that can occur does occur in the same period, the objects referenced by the occurring alarm notifications can be represented in a manner that can be manually changed by an operator of the control system or in a manner which changes automatically over time.

Advantageously, in a period in which none of the particular alarm notifications occurs, a visual and optionally an acoustic representation of an object different from the referenced object(s) can be generated in the variable diagram element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which they are achieved will become clearer and more comprehensible in conjunction with the following description of an exemplary embodiment which is explained in more detail in conjunction with the drawings, in which.

DETAILED DESCRIPTION OF THE EXEMPLARY EMBODIMENTS

Figure 1:
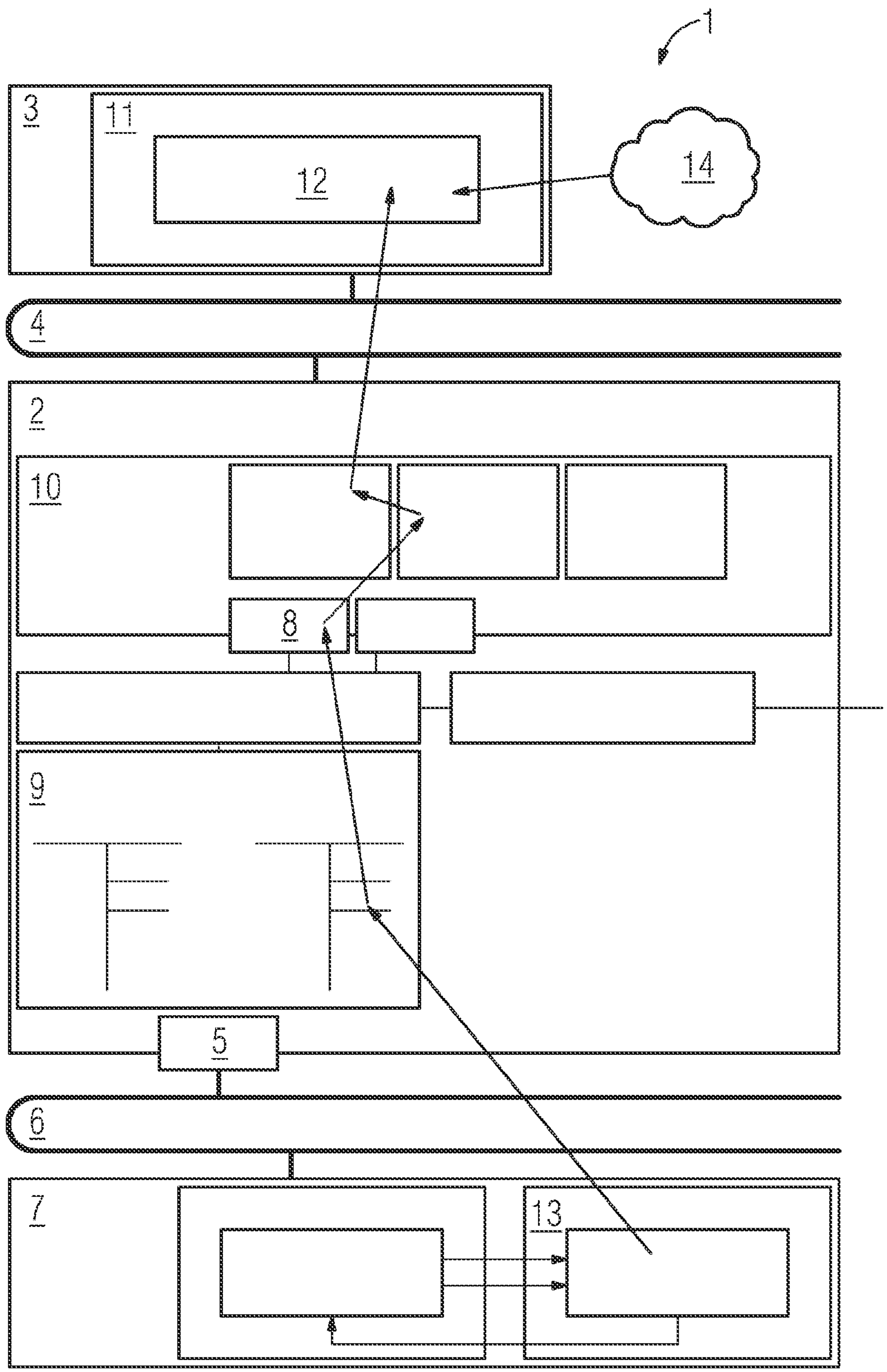
FIG. 1 shows a schematic diagram of an inventive control system.

FIG. 1 represents part of an inventive control system 1 of a technical plant configured as a processing plant, i.e., as a process-engineering plant. The control system 1 comprises an operator station server 2 and an operator station client 3.

The operator station server 2 and the operator station client 3 are connected together, and optionally to further components (not represented) of the control system 1, such as a process data archive, via a terminal bus 4.

For the purposes of activation and monitoring, a user or operator can access the operator station server 2 via the operator station client 3 by means of the terminal bus 4. The terminal bus 4 can be configured, for example, as an industrial Ethernet, without being limited hereto.

The operator station server 2 has a device interface 5 that is connected to a plant bus 6. The operator station server 2 can communicate with an automation device 7 and with optionally present further components of the processing plant via this device interface 5. The plant bus 6 can be configured, for example, as an industrial Ethernet, without being limited hereto. The automation device 7 can be connected to any desired number of subsystems (not represented).

An alarm notification service 8, a process image 9 and a visualization service 10 are implemented on the operator station server 2. The operator station client 3 is configured to represent a plant diagram 11 with a variable diagram element 12, and this will be discussed in more detail below.

The automation device 7 is configured to control and monitor an automation of a technical plant. For this purpose, a control program 13 is implemented on the automation device, where the program was previously loaded on the automation device 7 in the framework of a projection of the automation of the technical plant. If a defective state occurs during operation of the technical plant, then the automation device 7 generates an alarm notification according to predetermined rules, and this notification is transmitted to the process image 9 of the operator station server 2.

The alarm notification service 8 transfers the information about the alarm notification that has been newly generated/has occurred to the visualization service 10. The visualization service 10 then performs a check to determine whether the alarm notification is associated with the variable diagram element 12, i.e., whether the variable diagram element 12 has a reference to the alarm notification. Strictly speaking, the variable diagram element 12 does not have a reference to the (instantiated) alarm notification but to the type of alarm notification. This is expressed in the present disclosure in that the variable diagram element 12 has a reference to a particular alarm notification "that can occur". The visualization service 10 can perform a blanket check of every alarm notification that occurs for whether the underlying type of the respective alarm notification is referenced by a variable diagram element 12. The alarm notification(s) can also have a specific, additional attribute, however, which points to the association with the variable diagram element 12, so the visualization service 10 has to expend less capacity in identifying the references.

If such a reference exists in the case of the alarm notification that has been newly generated/has occurred, the visualization service 10 determines that an object 14 is visually and optionally acoustically represented in the variable diagram element 12 that is referenced by the alarm notification. Alternatively or in addition, the reference to the object 14 to be represented can also be associated with the variable diagram element 12. It is only important that when an alarm notification occurs that has a predetermined type, the predetermined object 14 is visually (and optionally acoustically) represented in an allocated variable diagram element 12. It must be possible to integrate the predetermined object 14 in the diagram generation for the operator station client 3 via the visualization service 10.

Figure 2:
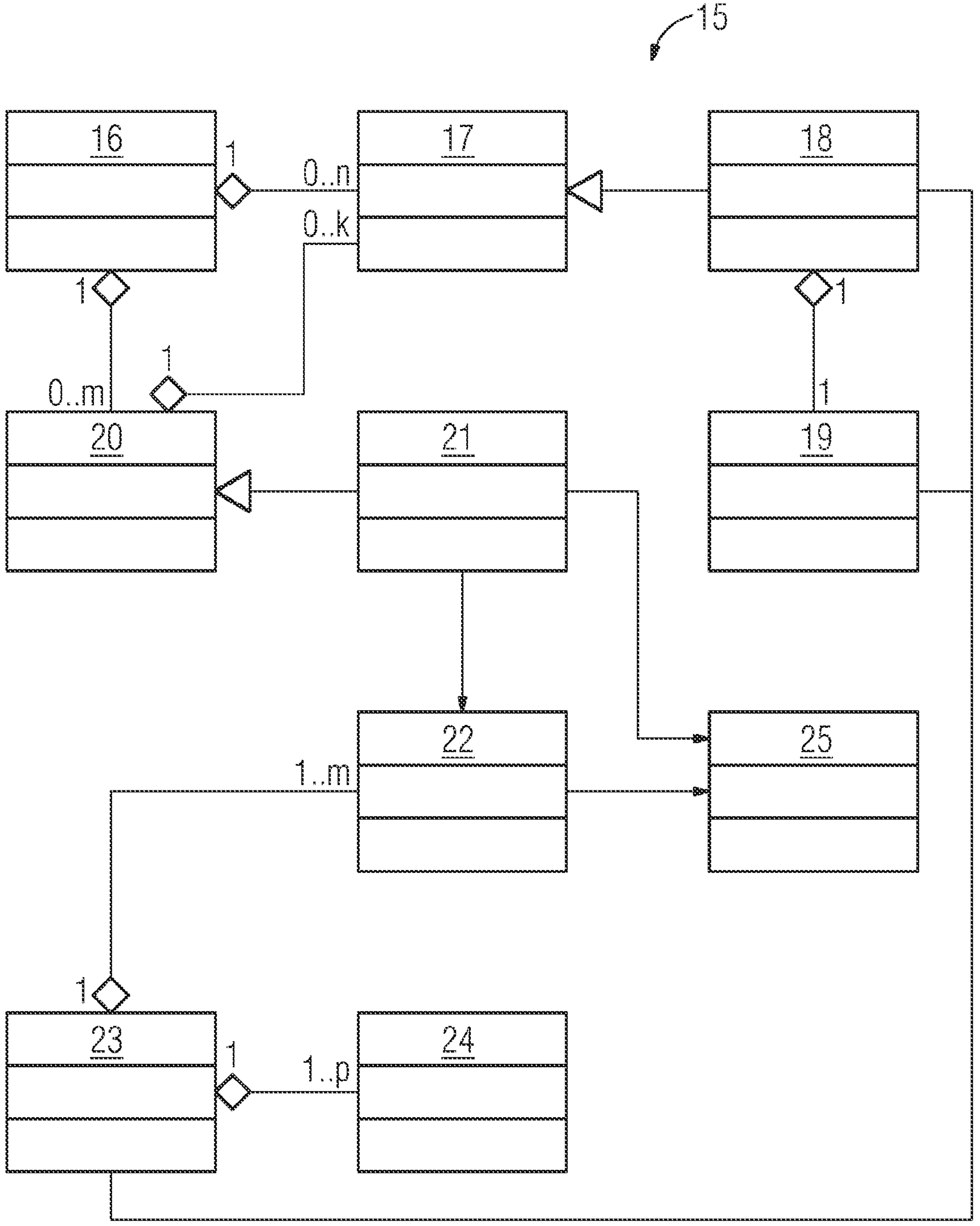
FIG. 2 shows an object model of an inventive control system.

FIG. 2 represents an object model 15 pertaining to the control system 1. A plant diagram 16 is composed of 1 to n diagram elements 17 (screen items). A specialization of a diagram element 18 is, for example, a block symbol of a technical object of the technical plant, which can in turn represent, for example, a user object 19 (also referred to as a "faceplate").

The plant diagram 16 can comprise 1 to m further plant diagrams 20 (also referred to as "screen windows"), which can be represented within the plant diagram 16. A specific one of these further plant diagrams 20 is a dynamic diagram element 21. Instances of this dynamic diagram element 21 can have references to types of alarm notification 22. The alarm notifications 22 are in turn linked to technical objects 23 or the associated tags 24. The alarm notifications 22 and the dynamic diagram elements 21 have one reference respectively to an object 25, which has already been explained above.

Figure 3:
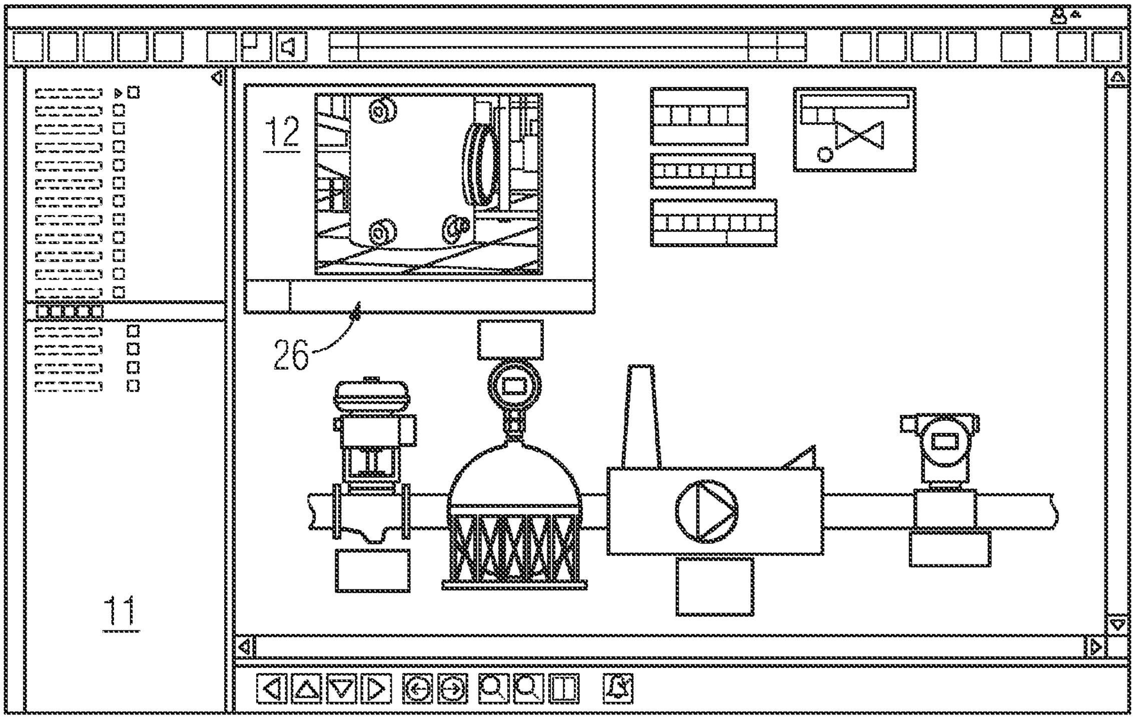
FIG. 3 shows a first visual representation of a plant diagram via an inventive control system.

FIG. 3 illustrates the plant diagram 11 from FIG. 1 in enlarged form and without further parts of the control system 1. It can be seen that, in addition to various symbols, the plant diagram 11 has a variable diagram element 12, which is marked by a thicker border. A camera image 14, which shows a process-engineering object, is represented in the variable diagram element 12.

Figure 4:
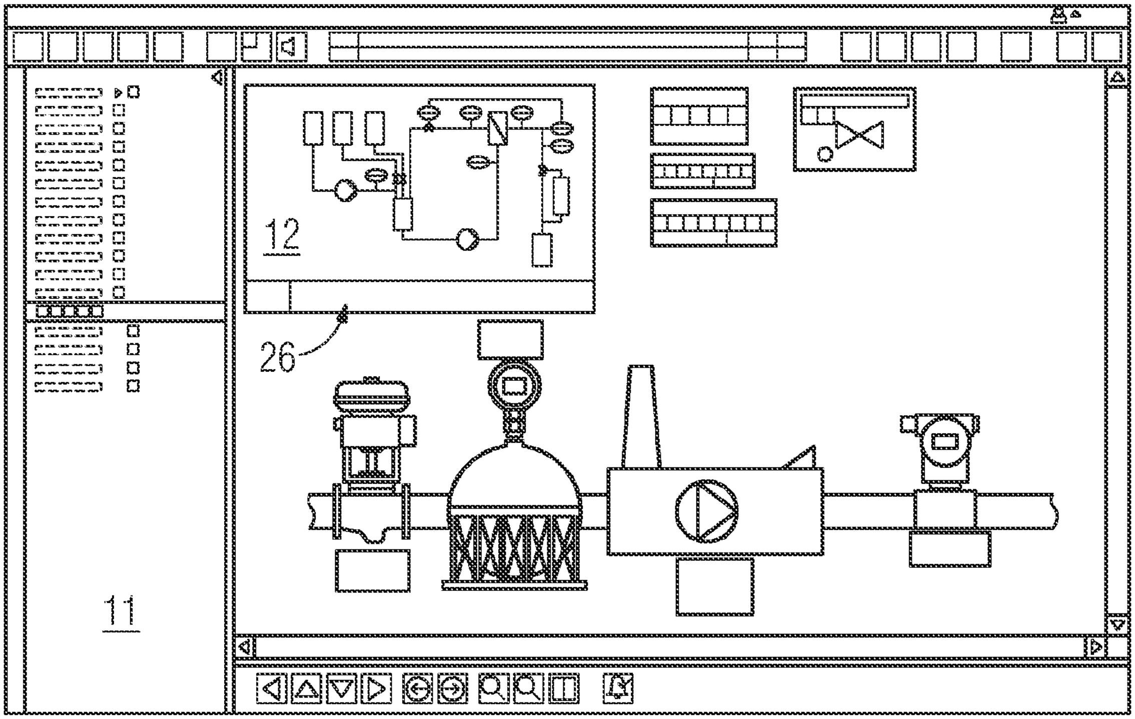
FIG. 4 shows a second visual representation of a plant diagram via an inventive control system.

FIG. 4 shows the plant diagram 11 from FIG. 3, where a piping diagram of a process-engineering plant is represented in the variable diagram element 12.

Overall, the invention can make a contribution to greater reliability and improved operability of the control system of the technical plant, especially when a web-based control system is used.

Figure 5:
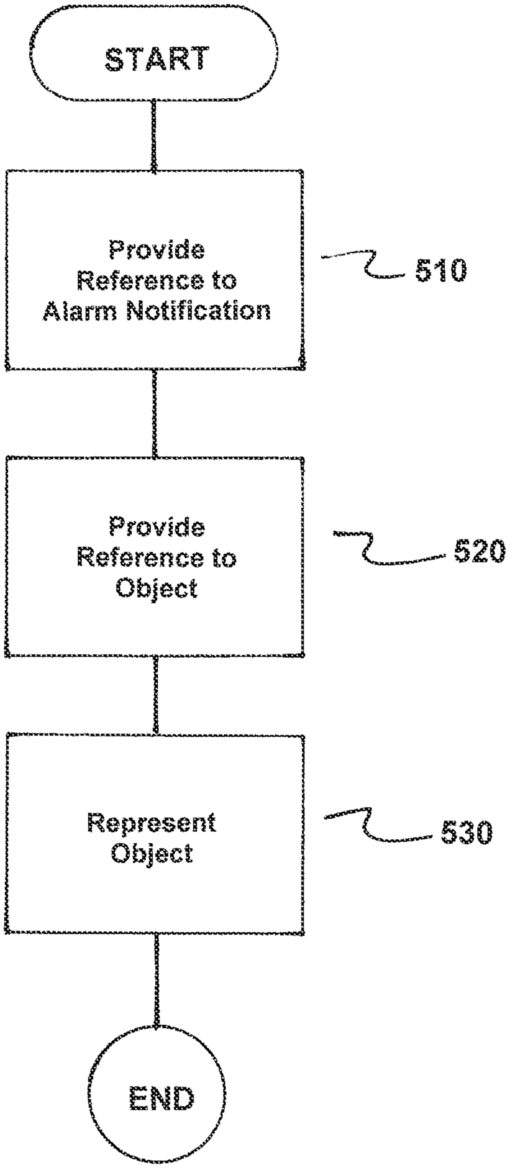
FIG. 5 is a flowchart of the method in accordance with the invention.

FIG. 5 is a flowchart of the method for operating a technical plant having a control system 1 including an operator station server 2 and an operator station client 3 that is configured to visually, and optionally acoustically, represent a plant diagram 11 with a variable diagram element 12 to an operator of the technical plant, where an alarm service 8 is implemented on the operator station server (2) and is configured to transmit alarm notifications occurring in the control system 1 to the operator station client (3) for presentation to the operator.

The method comprises a) providing the variable diagram element 12 with a reference to a particular alarm notification which can occur, as indicated in step 510.

Next, b) the particular alarm notification that can occur is provided with a reference to an object 14, as indicated in step 520.

Next, c) the object 14 is represented visually and optionally acoustically in the variable diagram element 12 by the operator station client 3 when the particular alarm notification which can occur does occur, as indicated in step 530. In accordance with the method, the object 14 represents a real-time diagram data source, a further plant diagram, a video or a document.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A control system for a technical plant, the control system comprising:

an operator station server; and an operator station client;

wherein for activation and monitoring, the operator station server is configured to transmit a plant diagram of the technical plant to the operator station client, the plant diagram comprising at least one variable diagram element wherein the operator station client is configured to visually, and optionally acoustically, represent the plant diagram with the variable diagram element to an operator of the technical plant;

wherein an alarm service is implemented on the operator station server, said alarm service being configured to transmit alarm notifications occurring in the control system to the operator station client for presentation to the operator;

wherein the control system is configured to provide at least one of (i) the variable diagram element with a reference to a particular alarm notification which can occur and the particular alarm notification which can occur and (ii) the variable diagram element with a reference to an object such that, when the particular alarm notification which can occur does occur, the object is visually and optionally acoustically represented in the variable diagram element, the object representing a real-time diagram data source, a further plant diagram, a video or a document.

2. The control system as claimed in claim 1, wherein the plant diagram comprises a plurality of variable diagram elements;

wherein the control system is further configured to provide at least one of (i) the variable diagram elements with one reference respectively to a particular alarm notification that can occur and the particular alarm notification that can occur and (ii) the variable diagram elements with a reference to an object such that, when the particular alarm notification which can occur does occur, the object is respectively visually and optionally acoustically represented in the variable diagram element; and wherein the particular diagram elements which can occur and the objects can differ from each other.

3. The control system as claimed in claim 1, wherein, in addition to the referenced object, the control system is further configured to also represent items of information relating to the alarm notification in the variable diagram element or in the plurality of variable diagram elements when a referenced alarm notification occurs.

4. The control system as claimed in claim 2, wherein, in addition to the referenced object, the control system is further configured to also represent items of information relating to the alarm notification in the variable diagram element or in the plurality of variable diagram elements when a referenced alarm notification occurs.

5. The control system as claimed in claim 3, wherein the items of information relating to the alarm notification comprises an alarm notification text.

6. The control system as claimed in claim 4, wherein the items of information relating to the alarm notification comprises an alarm notification text.

7. The control system as claimed in claim 1, wherein the control system is further configured to provide at least one of (i) the variable diagram element or the plurality of variable diagram elements with a plurality of references to particular alarm notifications which can occur and the particular alarm notifications which can occur and (ii) the variable diagram elements with one reference respectively to an object such that, when one of the particular alarm notifications that can occur does occur, the respective referenced object is visually and optionally acoustically represented in the variable diagram element.

8. The control system as claimed in claim 7, wherein when a plurality of the referenced alarm notifications which can occur do occur in a same period of time, the control system is configured to represent that object in the variable diagram element which is referenced by that alarm notification that occurs, which has a highest priority or a most recent time ranking or which has not been acknowledged.

9. The control system as claimed in claim 7, wherein when a plurality of the referenced alarm notifications which can occur do occur in a same period of time, the control system is further configured to represent at least one of (i) the objects referenced by the occurring alarm notifications and (ii) the variable diagram elements in a manner which is manually changeable by an operator of the control system or in a manner which changes automatically over time.

10. The control system as claimed in claim 1, wherein in a time range in which none of the particular alarm notifications occurs, the control system is further configured to generate a visual and optionally an acoustic representation of an object different from the referenced object(s) in the variable diagram element.

11. The control system as claimed claim 1, wherein the technical plant comprises a processing or manufacturing plant.

12. A method for operating a technical plant having a control system including an operator station server and an operator station client which is configured to visually, and optionally acoustically, represent a plant diagram with a variable diagram element to an operator of the technical plant, an alarm service being implemented on the operator station server and configured to transmit alarm notifications occurring in the control system to the operator station client for presentation to the operator, the method comprising:

a) providing the variable diagram element with a reference to a particular alarm notification which can occur;

b) providing the particular alarm notification which can occur with a reference to an object; and c) representing, visually and optionally acoustically, the object in the variable diagram element by the operator station client when the particular alarm notification which can occur does occur, the object representing a real-time diagram data source, a further plant diagram, a video or a document.

13. The method as claimed in claim 12, wherein a plurality of variable diagram elements is provided with one reference respectively to at least one particular alarm notification which can occur;

wherein the at least one particular alarm notification which can occur is provided with one reference respectively to an object, the at least one particular alarm notification which can occur being a single object or a plurality of objects;

wherein, the object or the objects is/are visually and optionally acoustically represented in the variable diagram element(s) by the operator station client when one of the particular alarm notifications which can occur does occur.

14. The method as claimed in claim 12, wherein, in addition to the referenced object, items of information relating to the alarm notification are also represented in the variable diagram element or in the plurality of variable diagram elements when a referenced alarm notification occurs.

15. The method as claimed in claim 13, wherein, in addition to the referenced object, items of information relating to the alarm notification are also represented in the variable diagram element or in the plurality of variable diagram elements when a referenced alarm notification occurs.

16. The method as claimed in claim 14, wherein the items of information relating to the alarm notification comprise an alarm notification text.

17. The method as claimed in claim 15, wherein the items of information relating to the alarm notification comprise an alarm notification text.

18. The method as claimed in claim 12, wherein the variable diagram element or the plurality of variable diagram elements is provided with a plurality of references to particular alarm notifications which can occur and the particular alarm notifications which can occur is provided with one reference respectively to an object such that, when one of the particular alarm notifications that can occur does occur, the respective referenced object is visually and optionally acoustically represented in the variable diagram element.

19. The method as claimed in claim 12, wherein when a plurality of the referenced alarm notifications which can occur does occur during a same period of time, the object is represented in the variable diagram element which is referenced by that alarm notification which occurs, which has a highest priority or a most recent time ranking or which has not been acknowledged.

20. The method as claimed in claim 12, wherein when a plurality of the referenced alarm notifications which can occur does occur during a same period of time, the objects referenced by the occurring alarm notifications are represented in a manner which is manually changeable by an operator of the control system or in a manner which changes automatically over time.

21. The method as claimed in claim 12, wherein in a time range in which none of the particular alarm notifications occurs, a visual and optionally an acoustic representation of an object different from the referenced object(s) is generated in the variable diagram element.

22. The method as claimed claim 12, wherein the technical plant comprises a processing or manufacturing plant.

* * * * *